United States Patent
Bian

(10) Patent No.: US 7,117,139 B2
(45) Date of Patent: Oct. 3, 2006

(54) CO-SIMULATION VERILOG/PLI AND SYSTEM C MODULES USING REMOTE PROCEDURE CALL

(76) Inventor: Qiyong Bian, 2882 Overlook Dr. #1818, Hillsboro, OR (US) 97124

( * ) Notice: Subject to any disclaimer, the term of this patent is extended or adjusted under 35 U.S.C. 154(b) by 654 days.

(21) Appl. No.: 09/941,068

(22) Filed: Aug. 28, 2001

(65) Prior Publication Data

US 2003/0093584 A1     May 15, 2003

(51) Int. Cl.
    *G06F 9/54*     (2006.01)
    *G06F 17/50*     (2006.01)

(52) U.S. Cl. ........................... 703/13; 703/22; 709/217; 709/310; 717/131

(58) Field of Classification Search ................. 703/21, 703/22, 13, 26; 713/2; 709/203, 219, 222, 709/217, 310; 717/136, 131
See application file for complete search history.

(56) References Cited

U.S. PATENT DOCUMENTS

| | | | | |
|---|---|---|---|---|
| 5,802,298 A | * | 9/1998 | Imai et al. ................. | 709/217 |
| 6,188,975 B1 | * | 2/2001 | Gay ............................ | 703/22 |
| 6,490,545 B1 | * | 12/2002 | Peng ........................... | 703/13 |
| 6,539,473 B1 | * | 3/2003 | Hubacher et al. .............. | 713/2 |
| 2002/0059054 A1 | * | 5/2002 | Bade et al. ................... | 703/20 |
| 2002/0101824 A1 | * | 8/2002 | Ziedman ..................... | 370/241 |
| 2002/0156929 A1 | * | 10/2002 | Hekmatpour ............... | 709/310 |
| 2002/0170037 A1 | * | 11/2002 | Powell ........................ | 717/131 |
| 2004/0088150 A1 | * | 5/2004 | Gay ............................. | 703/14 |

* cited by examiner

*Primary Examiner*—Thai Phan
(74) *Attorney, Agent, or Firm*—Schwegman, Lundberg, Woessner & Kluth, P.A.

(57) ABSTRACT

A Verilog/PLI module that simulates behavior of an electronic system is co-simulated in a clock-accurate manner with a System C module that models the behavior of a component of the electronic system using a remote procedure call (RPC). Adding RPC functionality to the Verilog/PLI and System C modules facilitates exchanging parameters between the modules. The RPC is used to transfer process control to the SystemC module, after execution of which control is returned to the Verilog/PLI module. A return value is also returned to the Verilog/PLI module; this return value represents output signals associated with the System C module.

30 Claims, 3 Drawing Sheets

CO-SIMULATION VERILOG/PLI AND SYSTEM C MODULES USING REMOTE PROCEDURE CALL

FIELD OF THE INVENTION

The present invention relates to circuit simulation techniques. More particularly, the present invention relates to simulation techniques using a programming language interface (PLI).

BACKGROUND

Hardware description languages (HDLs) have long been used in the simulation and synthesis of electronic circuits. One particular HDL, known as Verilog, is widely used and is recognized as IEEE Standard 1364.

In the Verilog HDL, modules developed using the C programming language are conventionally used to model the behavior of functions and algorithms. Conventional co-simulation techniques use a programming language interface (PLI) to serve as an interface between the Verilog HDL and C models. The PLI includes an interface, a set of routines to interact with the Verilog simulation environment, and a set of routines to access Verilog internal data structures. Accordingly, the PLI enables user-supplied C code to interact dynamically with the Verilog simulation and internal data structures.

Recently, C++ based behavior modeling languages have emerged. Among such languages, SystemC from Synopsis, Inc. is one of the most popular among designers. Compared to the standard C++ programming language, the SystemC programming language provides additional functionality for timing, scheduling, and logic vectors, which are crucial in modeling certain behaviors of hardware. Because of these features, C++ based modeling languages, and SystemC in particular, are quickly gaining ground in the world of hardware logic design and simulation.

Despite these advantages, a problem has been introduced when using SystemC for co-simulation with the Verilog/PLI modules. SystemC modules are no longer procedural functions, but rather stand-alone objects. There is no intuitive way to pass the parameters from Verilog/PLI modules to SystemC modules in a function calling manner.

Verilog/PLI is currently used to co-simulate Verilog and C modules. In Verilog/PLI, however, the PLI calls the C function directly, and Verilog and C run in a single process space. Because SystemC modules are not procedural functions, they cannot be called in the same manner as C modules. Thus, conventional techniques for co-simulating Verilog and C modules are ineffective for co-simulating Verilog and SystemC modules. Accordingly, a need continues to exist for a technique for facilitating Verilog/PLI and SystemC co-simulation.

SUMMARY OF THE INVENTION

The above mentioned and other deficiencies are addressed in the following detailed description. According to various implementations of the present invention, a client function and a server function are added to the Verilog/PLI module and SystemC module for the exchange of parameters using the Remote Procedure Call (RPC). Clock-accurate Verilog/PLI and SystemC co-simulation are facilitated as a result.

One particular embodiment involves executing a client module configured to simulate behavior of an electronic system. An RPC is used to transfer process control to a server module that models behavior of a component of the electronic system. Process control is returned to the client module after execution of the server module.

In another embodiment, a Verilog/PLI module configured to simulate behavior of an electronic system is executed. An RPC is used to transfer process control to a SystemC module that models behavior of a component of the electronic system. Operation of the SystemC module is suspended and simulation time is advanced by a clock signal. Finally, a return value is returned to the Verilog/PLI module after execution of the SystemC module. This return value represents a plurality of output signals. In still other particular embodiments, the SystemC module has a plurality of global signals mapped to at least one of an input port of the SystemC module and an output port of the SystemC module.

Other embodiments are directed to computer-readable media for performing the above methods. The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1:
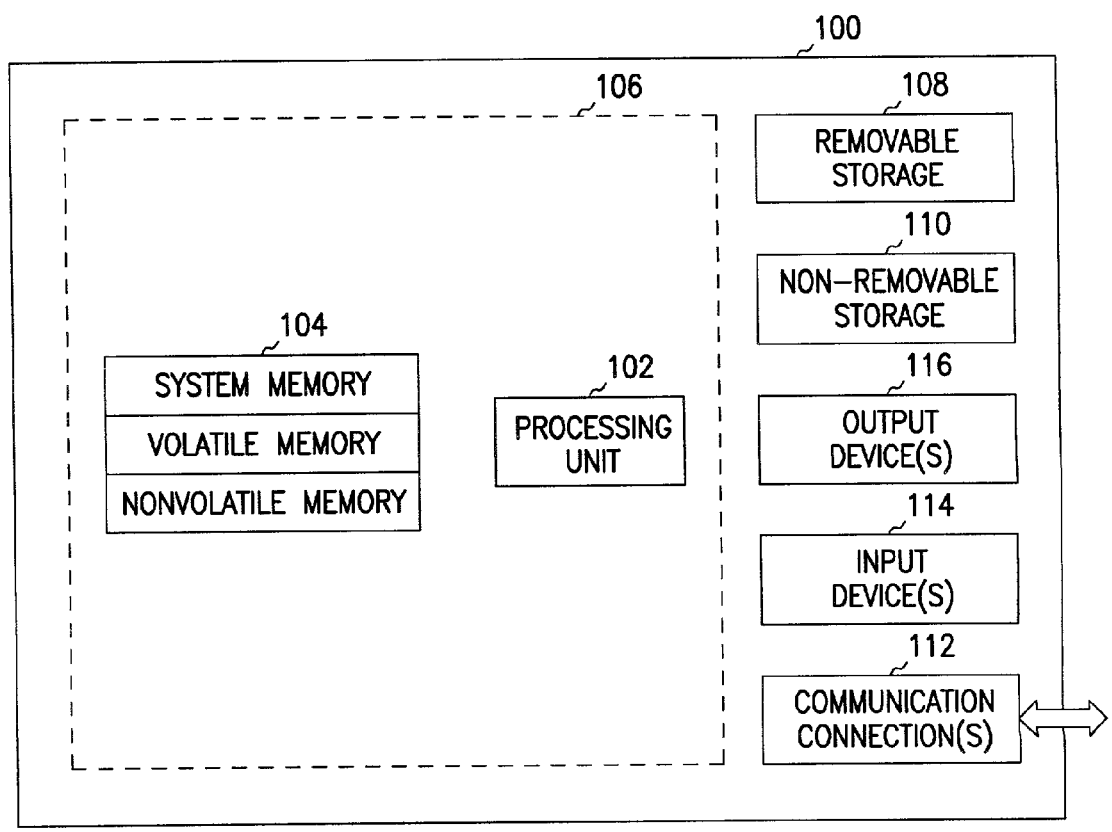
FIG. 1 depicts an example operating environment for implementing the present invention.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following detailed description of the invention, reference is made to the accompanying drawings, which form a part hereof, and in which is shown, by way of illustration, specific embodiments in which the invention may be practiced. In like drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

According to various embodiments of the present invention, Remote Procedure Call (RPC) functionality is added to a SystemC module and to PLI. As a result, Verilog/PLI and SystemC co-simulation is made possible. In most, if not all, simulation cases, the SystemC module acts as the server, serving requests from the Verilog/PLI routine, which acts as the client.

This disclosure provides sufficient information to enable one of ordinary skill in the art to add RPC client initialization code to PLI, to add RPC server initialization code to SystemC modules, to add the RPC call in the PLI, and to add the server routine to the SystemC module. To facilitate understanding, an operational example is discussed in which a C model of a CRT controller is converted from a conventional Verilog/PLI/C simulation to a Verilog/PLI/SystemC co-simulation, according to an embodiment of the present invention.

Example Operating Environments

With reference to FIG. 1, an example system for implementing the invention includes a computing device 100. In its most basic configuration, the computing device 100 typically includes at least one processing unit 102 and a memory 104. Depending on the particular configuration and type of computing device, the memory 104 may be volatile (e.g., RAM), non-volatile (e.g., ROM, flash memory, etc.), or some combination of the two. This most basic configuration is illustrated in FIG. 1 by dashed line 106. Additionally, the computing device 100 may also include additional storage, including, for example, magnetic or optical discs or tape. Such additional storage is depicted as removable storage 108 and non-removable storage 110. Computer storage media includes volatile and nonvolatile, removable and non-removable media implemented in any method or technology for storage of information, including computer-readable instructions, data structures, program modules, or other data. The memory 104, removable storage 108, and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that can be used to store the desired information and that can be accessed by the computing device 100. Any such computer storage media can be part of the computing device 100.

The computing device 100 can also contain communications connections 112 that allow the computing device 100 to communicate with other computing devices. Communication media typically embodies computer readable instructions, data structures, program modules or other data in a modulated data signal, such as a carrier wave or other transport mechanism and includes any information delivery media. The term "modulated data signal" means a signal that has one or more of its characteristics set or changed in such a manner as to encode information in the signal. By way of example and not limitation, communication media includes wired media, such as a wired network or direct-wired connection, and wireless media, such as acoustic, RF, infrared, and other wireless media. The term computer-readable media as used herein includes both storage media and communication media.

The computing device 100 may also have input devices 114, such as a keyboard, a mouse, a light pen, a voice input device, and/or a touch input device. Output devices 116, such as a display, speakers, a printer, and the like may also be included. All of these devices are well known in the art and need not be discussed at length herein.

Example Embodiments

Figure 2:
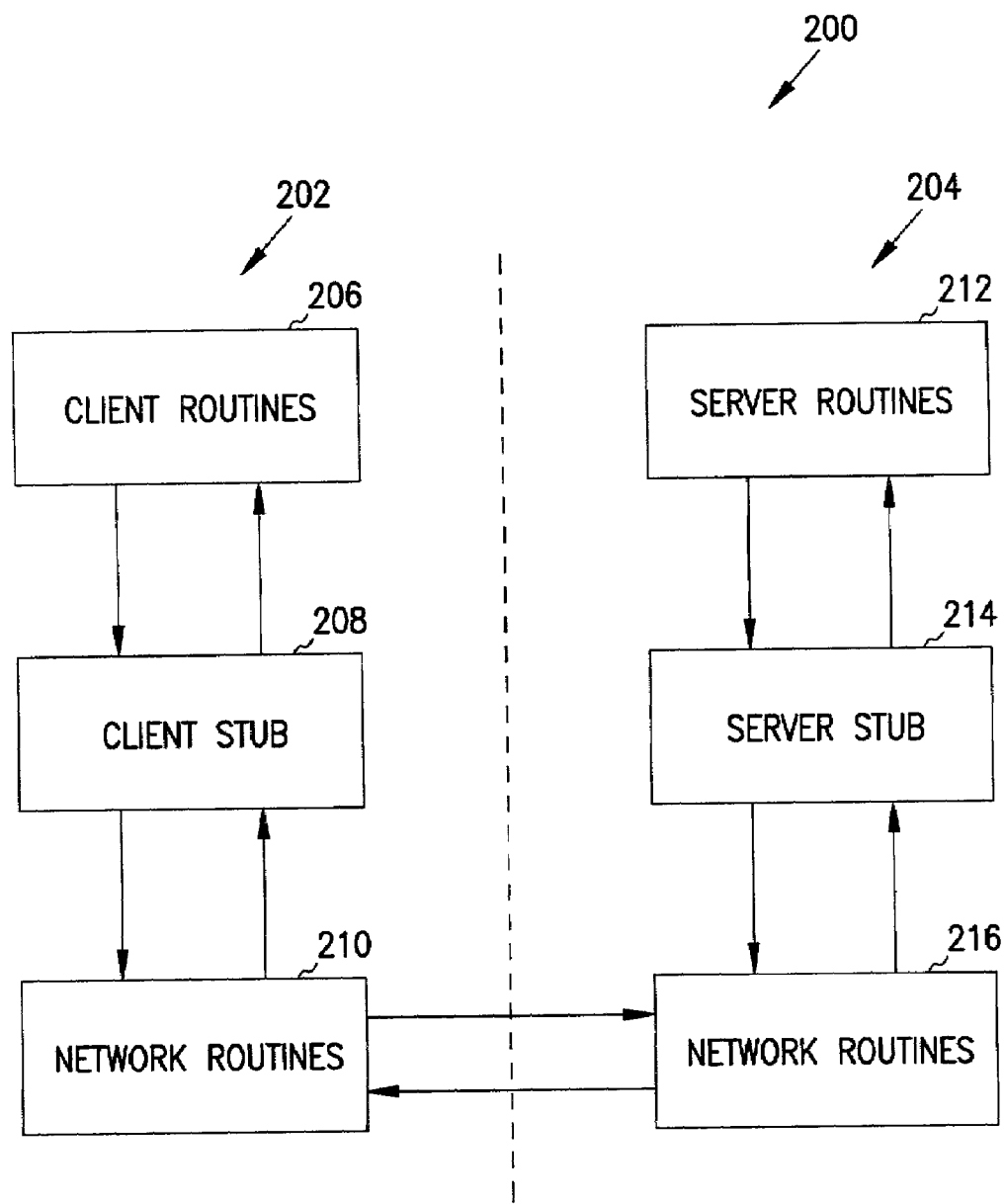
FIG. 2 is a block diagram that conceptually depicts an example system for co-simulating Verilog/PLI and SystemC modules using a Remote Procedure Call (RPC), according to a particular embodiment of the present invention.

FIG. 2 conceptually illustrates an example system 200 for co-simulating Verilog/PLI and SystemC modules using a Remote Procedure Call (RPC), according to one example embodiment of the present invention. Using co-simulation, Verilog/PLI and SystemC are run as two distinct processes, linked by the RPC. The RPC was introduced by Sun Microsystems, and is available on almost all varieties of the UNIX operating system. Using the RPC, control is transferred from one part of a process to another, with control returning to the caller. The processes can reside on the same machine, or on different machines on a network.

RPC is essentially an application layer network protocol. It uses either TCP or UDP as the transport layer protocol. If the client and server run on the same machine, UDP is preferable due to the lower overhead associated with UDP. A description of a particular implementation of RPC is found in the RFC1057 standard used by Sun Microsystems, available on the Internet at http://www.faqs.org/rfcs/rfc1057.html and attached to this disclosure as an Appendix.

Generally, the system 200 includes a client 202 and a server 204. The client 202 uses various client routines 206, a client stub 208, and client-side network routines 210 to interface with the network. Similarly, the server 204 uses server routines 212, a server stub 214, and server-side network routines 216 for interfacing with the network.

In a particular implementation, the client routines 206 are implemented as Verilog routines with a PLI wrapper, while the server routines 212 are implemented as SystemC server routines. In this implementation, the PLI wrapper performs client-side RPC initialization at the beginning of the co-simulation session. The PLI wrapper then calls the RPC server as needed, for example, during every clock cycle. The input signals are passed as the argument of the function call, and the return value contains all of the output signals from the server.

On the server side, a main SystemC server routine sc_main( ) instantiates all SystemC modules and maps the input ports to a set of signals. The sc_main( ) routine performs server-side RPC initialization and then calls the RPC server routine. This server routine suspends the SystemC process. The server routine is subsequently re-activated by a call from the Verilog/PLI client. When the server routine is re-activated, it updates the input signals, advances the simulation time by a clock cycle (assuming the client calls the server during every clock cycle), and returns the output signals to the client. Finally, the server routine suspends the SystemC process until it is called again by the client.

Figure 3:
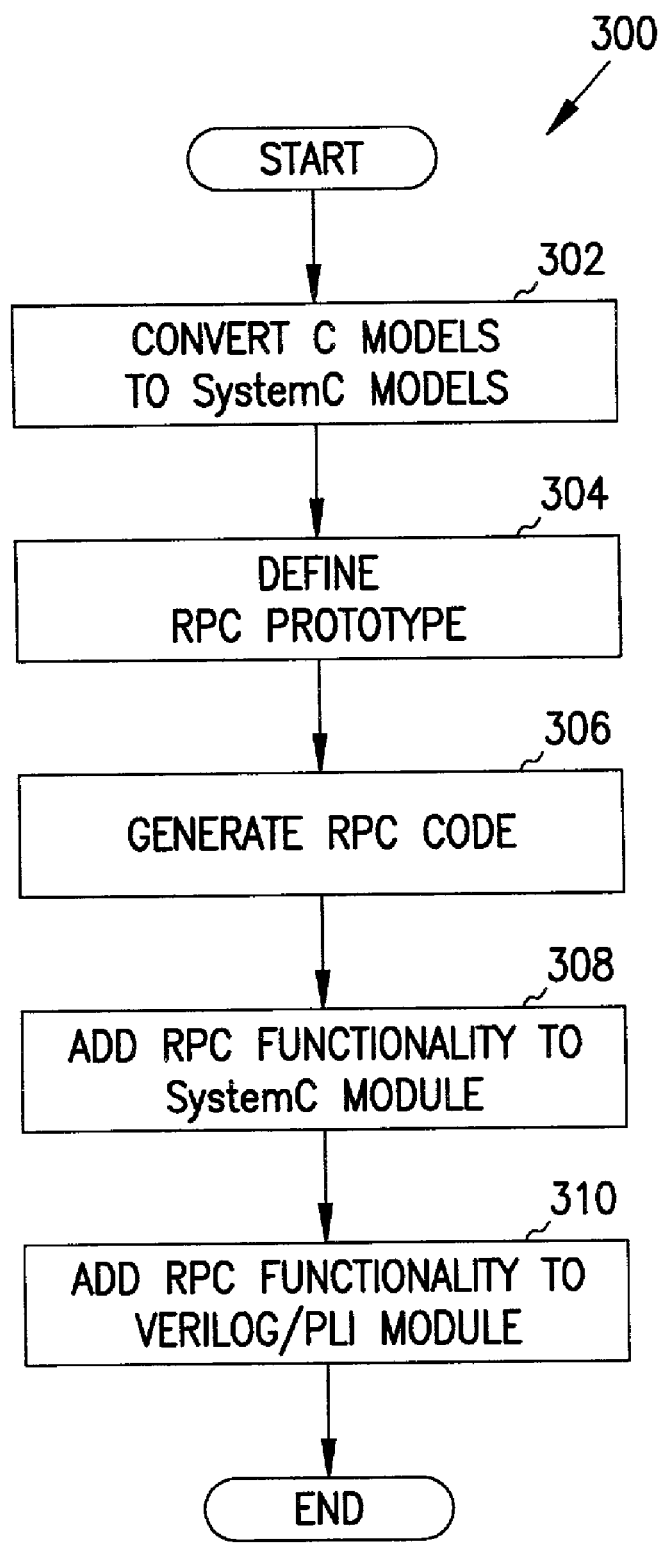
FIG. 3 is a flow chart illustrating an example method for co-simulating Verilog/PLI and SystemC modules using a Remote Procedure Call (RPC), according to another particular embodiment of the present invention.

FIG. 3 depicts an example method 300 for co-simulating Verilog/PLI and SystemC modules using a Remote Procedure Call (RPC), according to another particular embodiment of the present invention. First, at a block 302, the C models are converted to SystemC models. This conversion process can be omitted if the behavior is already modeled using the SystemC programming language.

To convert a C model to a SystemC model, a SystemC wrapper is added to the C model. This process involves defining a SystemC module and adding input/output ports that correspond to the C model input/output arguments. The SystemC module is made sensitive to a positive clock edge, and the system calls the actual C function inside the method that is invoked for every positive clock edge.

Next, at a block 304, the RPC prototype is defined based on the RPC language grammar. This is a rather simple process, and the syntax is almost identical to the C language. A conventional editor can be used to create the prototype file, which has a .x extension. By way of example, the prototype file data.x for the CRT controller model may take the following form:

```
struct input_t {
    unsigned int sreset;
    unsigned int preset;
    . . .
};
struct output_t {
    unsigned int c_m_req;
    unsigned int c_m_reqaddr;
    . . . .
};
program XCHG_PROG {
    version XCHG_VERS {
        output_t pli2sc(input_t) = 1;
    } = 1;
} = 0x2c0012be;
```

The input_t structure in the above example is defined because RPC accepts only one argument. Consequently, all inputs must be associated with a single structure, which is used as the argument. Similarly, all outputs are associated with a single structure, e.g., the output_t structure in the above example. It should be noted that the keyword struct need not be used before input_t and output_t.

The RPC call is then declared. The combination of a program identifier XCHG_PROG and a version identifier XCHG_VERS are used to uniquely identify this RPC call. Any program identifier in the range of 0x20000000 to 0x3fffffff can be used, as long as it is ensured the identifier is unique during run time.

After the RPC prototype is defined, flow proceeds to a block 306, at which the RPC code is generated automatically using, for example, a utility program that generates code that can be cut, pasted, and linked for use in connection with the RPC. In the above example, the following files are generated: data.h, data_clnt.c, data_svc.c, and data_xdr.c. Among these files, data.h is a header file for inclusion in both the SystemC module and the PLI routine. Data_xdr.c is the file that is used in host/network argument/return value conversion and is linked to the executable for both SystemC and PLI. The functions of the data_svc.c and data_clnt.c files are discussed in greater detail below.

Next, at a block 308, RPC functionality is added to the SystemC module. On the server side, a file main.cpp (or any file that contains the sc_main( ) routine) is created, if it does not already exist, or modified. In particular, certain header files are added to the file main.cpp:

include <systemc.h>
include "data.h"
include <stdio.h>
include <stdlib.h>
include <rpc/pmap_clnt.h>
include <string.h>
include <memory.h>
include <sys/socket.h>
include <netinet/in.h>
ifdef solaris
include <rpc/svc_soc.h>
endif
ifndef SIG_PF
define SIG_PF void(*) (int)
endif If the System C module is to be run under SparcOS, the <rpc/svc_soc.h> file is added. If, on the other hand, the SystemC module is to be run under Linux, this file need not be added.

Also in connection with block 308, a set of global SystemC signals are added. These global SystemC signals correspond to the input and output ports of the SystemC module, and are mapped to the actual ports later when instantiating the module. For the sake of brevity, only a few such lines from the file main.cpp are illustrated below:
/* define the set of global signals which are to be mapped to SC Module ports */
sc_clock sclk("S_Clock", 1, 0.5);
sc_clock pclk("P_Clock", 1, 0.5);
sc_signal<bool> sreset;
sc_signal<bool> preset;
sc_signal<bool> c_m_req;
. . .

Next, the entire data conversion wrapper routine is copied from the file data_svc.c to the file main.cpp. By way of illustration and not limitation, this process is shown below using the example routine xchg_prog_1. Again in the interest of brevity, only a few of the lines are shown here:

```
/* put data conversion wrapper routine here (copy directly from
<filename>_svc.c) */
static void
xchg_prog_1 (struct svc_req *rqstp, register SVCXPRT *transp)
{
    union {
        input_t pli2sc_1_arg;
    } argument;
    char *result;
    xdrproc_t _xdr_argument, _xdr_result;
    char * (*local) (char *, struct svc_req *);
    switch (rqstp->rq_proc) {
    case NULLPROC:
        (void) svc_sendreply (transp, (xdrproc_t) xdr_void,
(char *) NULL);
        . . .
    }
```

Within the sc_main( ) routine, the SystemC module to be simulated is then instantiated. The signals defined earlier—the global SystemC signals that correspond to the input/output ports of the SystemC module—are then mapped to the input/output ports. In the operational example of the CRT controller model, the code that instantiates the SystemC module takes the following form:
// instantiate SC module and map signals to ports
crtc dut("no_name");
dut.sclock(sclk);
dut.pclock(pclk);
dut.sreset(sreset);
dut. preset (preset)
. . .

Next, the entire main( ) routine is copied from the data_svc.c following the instantiation. The first and last few lines appear as follows:

```
register SVCXPRT *transp;
pmap_unset (XCHG_PROG, XCHG_VERS);
    transp = svcudp_create (RPC_ANYSOCK);
    if (transp == NULL) {
        fprintf (stderr, "cannot create udp service.");
```

```
        exit(1);
    }
    ...
    svc_run ( );
    // not reachable
}
```

If present, the sc_start( ) routine is deleted, and an sc_initialize( ) routine is added immediately before the svc_run( ) routine. Thus, the code takes the following form:

sc_initialize( );
   svc_run ( );

The sc_start( ) routine is deleted to prevent the SystemC kernel from advancing the clock, which should only be advanced at the RPC server routine. The RPC suspends the whole SystemC process until it gets a request from the client. Deleting the sc_start( ) routine facilitates synchronizing the co-simulation between Verilog/PLI and SystemC.

The final process involved in adding the RPC functionality to the SystemC modules at block 308 is to add the actual RPC server routine. The RPC server routine is responsible for various functions associated with synchronizing co-simulation with the Verilog/PLI, such as, for example, updating signals and advancing the clock.

The name of the RPC server routine is defined in the data.h file. In the operational example of the CRT controller model, the RPC server routine is named pli2sc_1_svc( ). It should be noted that in other applications, the name of the server routine is expected to vary. As mentioned above, the RPC server routine performs a number of functions. First, the RPC server routine declares a static return variable. The variable must be defined as type static because the return variable will be passed to the RPC utility routine for network transmission. An automatic local variable will be destroyed when out of scope. Defining the variable as type static prevents the variable from being destroyed in this manner. Next, the input signals are updated by copying the input argument's members directly to them, as illustrated in the following example code:

```
struct output_t*
pli2sc_1_svc(struct input_t *input, struct svc_req *cl)
{
    static struct output_t output;
    // update input signals
    sreset = input->sreset;
    preset = input->preset;
    ...
```

Next, the clock is advanced by one cycle. If, as in the CRT controller example, there are two clocks, another input variable is used to determine which clock should be advanced. It should also be noted that the clocks in the operational example have a period of one unit and a 50% duty cycle, i.e., in the high state 50% of the time and in the low state the other 50% of the time. In other applications, the period or duty cycle, or both, may differ, and the parameters should be adjusted accordingly. The following code segment illustrates one example implementation for selectively advancing either the S-clock or the P-clock in the CRT controller model example:

```
// advance clock by 1 cycle
if (purpose == CRTC_CLKS) { // advance S-Clock
    sclk = 1;
    sc_cycle(0.5);
    sclk = 0;
    sc_cycle(0.5);
}
else { // advance P-Clock
    pclk = 1;
    sc_cycle(0.5);
    pclk = 0;
    sc_cycle(0.5);
}
```

After advancing the clock or clocks, the output signals can be copied back to the return struct variable, as in the following example:

// copy updated output signals back to Verilog/PLI
   output.c_m_req=c_m_req;
   output.c_m_reqaddr=c_m_reqaddr.read( );

Finally, the address of the output variable is returned—RPC requires that the pointer to the actual return value to be returned, rather than the actual return value itself:

```
    return (&output);
}
```

Having added RPC functionality to the SystemC module on the server side, the final step is to add RPC functionality to the Verilog/PLI on the client side. This process is shown at block 310 of FIG. 3, and is considerably simpler than the modifications performed in connection with block 308, as only a single file, namely, the PLI.c file, needs to be modified.

First, the PLI.c file, if present, is opened. If no PLI.c file is present, it can be created using conventional techniques well known to those of ordinary skill in the art. The RPC C header file, for example, data.h, is then included in the PLI.c file. Next, a number of global variables are defined. These global variables include, but are not necessarily limited to, the input and output variables for the RPC, the RPC client handle, and the name of the server. Alternatively, the name of the server can be declared locally to the misc_tf routine( ) rather than globally. Local declaration of the name of the server may provide certain advantages over statically linking it with the executable. In the interest of simplicity, however, the server name is hardcoded in the PLI routine in the example below. It is recommended that the server be named "localhost", such that Verilog/PLI and SystemC are both run on the same machine. Running both Verilog/PLI and SystemC on the same machine ensures almost perfect reliability, as packets cannot get duplicated or lost when RPC is executing locally. Further, in most cases, better performance is realized, unless there are multiple RPC server routines running and it is desirable to distribute them to different machines. The following example code segment illustrates declaration of some global variables:

static struct input_t input;
static struct output_t *output;
static CLIENT *cl; /* RPC handle */
static const char server[ ]="localhost"; /* put name of server here */

Next, at the entry point of PLI(call_tf( )), the input variable is updated. In addition, the evaluation of the misc_tf( ) is arranged one clock cycle later:

```
int call_crtc_tf( )
{
    /* copy input signal values to input struct (which to be
passed as arg of RPC) */
        input.sreset = tf_getp (1);
        input.preset = tf_getp (2);
        ...
        /* Arrange for the RPC call (delay 1 clock cycle) */
        tf_setdelay(1);
}
```

Next, misc_tf( ) routine is modified so that it issues the actual RPC client request. By checking the reason argument, it can be determined whether the misc_tf( ) routine is called for the first time, the last time, or invoked by call_tf( ). If the misc_tf( ) routine is being called for the first time, the RPC client is initialized. If the simulation ends, some RPC cleanup is performed. If the misc_tf( ) routine is invoked by the call_tf( ) routine, the server routine of SystemC is called for co-simulation.

It should be noted that, in the initialization part, the UDP protocol is used as the underlying transport protocol. If the SystemC process is running on a different machine, the TCP protocol is preferably used as the underlying transport protocol to guarantee transmit and receive reliability. The following example code segment illustrates the modified misc_crtc_tf( ) routine for the CRT controller example:

```
/* Actual RPC done here */
int misc_crtc_tf(int data, int reason)
{
    switch (reason) {
    case REASON_ENDOFCOMPILE:
        /* put RPC initialization code here */
        if ((cl = clnt_create (server, SCHG_PROG, XCHG_VERS,
"udp")) == NULL) {
            clnt_pcreateerror (server)
            exist (2);
        }
        printf("Verilog/PLI establishes RPC connection with
server . . . \n") ;
        break;
    case REASON_FINISH:
        /* put RPC clean-up code here */
        clnt_destroy(cl);
        printf("Verilog/PLI disconnects with RPC server . . . \n");
        break;
    case REASON_REACTIVATE:
        /* call RPC server and pass back the return value to
Verilog */
        input.inst_id = data >> 4;
        input.purpose = data & 0xF;
        if ((output = pli2sc_1(&input, cl)) == NULL) {
            clnt_perror (cl, server);
            exit (3);
        }
        /* copy back return value to Verilog */
        tf_putp (3, output ->c_m_req);
        tf_putp (4, output ->c_m_reqaddr);
        ...
        break;
    }
    return 0;
}
```

Finally, the makefile is modified to reflect the above-described changes. In addition, the data_clnt.c and data_xdr.c files are linked to the Verilog/PLI executable, and the data_xdr.c file is linked to the SystemC executable. As previously noted, these file names are provided by way of example only, and the actual file names used in a particular application may vary.

CONCLUSION

As described above, adding RPC functionality to the Verilog/PLI and SystemC modules facilitates exchanging parameters between the modules. Accordingly, clock-accurate Verilog/PLI and SystemC co-simulation are facilitated. The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A computer-implemented method, comprising:
   executing a client module configured to simulate behavior of an electronic system;
   using a remote procedure call (RPC) to transfer process control to a server module that models behavior of a component of the electronic system;
   controllably advancing simulation time; and
   returning process control to the client module after execution of the server module.

2. The method of claim 1, wherein the client module is a Verilog/PLI module.

3. The method of claim 1, wherein the server module is a System C module.

4. The method of claim 1, wherein the RPC uses the TCP protocol as a transport layer protocol.

5. The method of claim 1, wherein the RPC uses the UDP protocol as a transport layer protocol.

6. The method of claim 1, further comprising mapping a plurality of input ports of the server module to a plurality of signals.

7. The method of claim 1, further comprising suspending operation of the server module.

8. The method of claim 1, further comprising returning a return value to the client module after execution of the server module, the return value representing a plurality of output signals.

9. The method of claim 1, further comprising advancing simulation time by one cycle of a clock signal.

10. The method of claim 9, wherein the server module is configured to be sensitive to a positive edge of the clock signal.

11. A computer-readable medium having computer-executable instructions for:
    executing a client module configured to simulate behavior of an electronic system;
    using a remote procedure call (RPC) to transfer process control to a server module that models behavior of a component of the electronic system;
    controllably advancing simulation time; and
    returning process control to the client module after execution of the server module.

12. The computer-readable medium of claim 11, wherein the client module is a Verilog/PLI module.

13. The computer-readable medium of claim 11, wherein the server module is a System C module.

14. The computer-readable medium of claim 11, wherein the RPC uses the TCP protocol as a transport layer protocol.

15. The computer-readable medium of claim 11, wherein the RPC uses the UDP protocol as a transport layer protocol.

16. The computer-readable medium of claim 11, having further computer-executable instructions for mapping a plurality of input ports of the server module to a plurality of signals.

17. The computer-readable medium of claim 11, having further computer-executable instructions for suspending operation of the server module.

18. The computer-readable medium of claim 11, having further computer-executable instructions for returning a return value to the client module after execution of the server module, the return value representing a plurality of output signals.

19. The computer readable medium of claim 11, having further computer-executable instructions for advancing simulation time by one cycle of a clock signal.

20. The computer-readable medium of claim 19, wherein the server module is configured to be sensitive to a positive edge of the clock signal.

21. A computer-implemented method, comprising:
   executing a Verilog/PLI module configured to simulate behavior of an electronic system;
   using a remote procedure call (RPC) to transfer process control to a System C module that models behavior of a component of the electronic system;
   suspending operation of the System C module;
   advancing simulation time by one cycle of a clock signal; and
   returning a return value to the Verilog/PLI module after execution of the System C module, the return value representing a plurality of output signals.

22. A computer-readable medium having computer-executable instructions for:
   executing a Verilog/PLI module configured to simulate behavior of an electronic system;
   using a remote procedure call (RPC) to transfer process control to a System C module that models behavior of a component of the electronic system;
   suspending operation of the System C module;
   advancing simulation time by one cycle of a clock signal; and
   returning a return value to the Verilog/PLI module after execution of the System C module, the return value representing a plurality of output signals.

23. A computer-implemented method, comprising:
   executing a Verilog/PLI module configured to simulate behavior of an electronic system;
   using a remote procedure call (RPC) to transfer process control to a System C module that models behavior of a component of the electronic system, the System C module having a plurality of global signals mapped to at least one of an input port of the System C module and an output port of the System C module;
   suspending operation of the System C module;
   advancing simulation time by one cycle of a clock signal having a 50% duty cycle; and
   returning a pointer associated with a return value to the Verilog/PLI module after execution of the System C module, the return value representing a plurality of output signals.

24. The method of claim 23, further comprising generating the System C module by modifying a model created using the C programming language.

25. The method of claim 23, further comprising implementing the RPC at least in part in the Verilog/PLI module.

26. The method of claim 23, further comprising implementing the RPC at least in part in the System C module.

27. A computer-readable medium having computer-executable instructions for:
   executing a Verilog/PLI module configured to simulate behavior of an electronic system;
   using a remote procedure call (RPC) to transfer process control to a System C module that models behavior of a component of the electronic system, the System C module having a plurality of global signals mapped to at least one of an input port of the System C module and an output port of the System C module;
   suspending operation of the System C module;
   advancing simulation time by one cycle of a clock signal having a 50% duty cycle; and
   returning a pointer associated with a return value to the Verilog/PLI module after execution of the System C module, the return value representing a plurality of output signals.

28. The computer-readable medium of claim 27, having further computer-executable instructions for generating the System C module by modifying a model created using the C programming language.

29. The computer-readable medium of claim 27, having further computer-executable instructions for implementing the RPC at least in part in the Verilog/PLI module.

30. The computer-readable medium of claim 27, having further computer-executable instructions for implementing the RPC at least in part in the System C module.

* * * * *

UNITED STATES PATENT AND TRADEMARK OFFICE
CERTIFICATE OF CORRECTION

PATENT NO. : 7,117,139 B2 Page 1 of 1
APPLICATION NO. : 09/941068
DATED : October 3, 2006
INVENTOR(S) : Bian It is certified that error appears in the above-identified patent and that said Letters Patent is hereby corrected as shown below:

On Title page, Item (54), in "Title", in column 1, line 1, after "CO-SIMULATION" insert -- OF --.

In column 1, line 1, after "CO-SIMULATION" insert -- OF --.

In column 6, line 55, delete "dut. preset (preset)" and insert -- dut.preset(preset); --, therefor.

Signed and Sealed this

Thirteenth Day of March, 2007

JON W. DUDAS
*Director of the United States Patent and Trademark Office*